United States Patent
Mochev et al.

(10) Patent No.: US 12,384,118 B2
(45) Date of Patent: Aug. 12, 2025

(54) METHOD FOR PRODUCING A MOULDED BODY THAT ENCLOSES A CAVITY BY WELDING TWO PARTIAL BODIES, AND DIE FOR WELDING TWO PARTIAL BODIES

(71) Applicant: BASF SE, Ludwigshafen am Rhein (DE)

(72) Inventors: Stefan Mochev, Ludwigshafen (DE); Ulrich Endemann, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 111 days.

(21) Appl. No.: 17/430,749

(22) PCT Filed: Feb. 4, 2020

(86) PCT No.: PCT/EP2020/052773
§ 371 (c)(1),
(2) Date: Aug. 13, 2021

(87) PCT Pub. No.: WO2020/164978
PCT Pub. Date: Aug. 20, 2020

(65) Prior Publication Data
US 2022/0134676 A1     May 5, 2022

(30) Foreign Application Priority Data
Feb. 14, 2019   (EP) .................................... 19157240

(51) Int. Cl.
*B29C 65/10*     (2006.01)
*B29C 65/00*     (2006.01)
*B29L 22/00*     (2006.01)

(52) U.S. Cl.
CPC ........ *B29C 65/103* (2013.01); *B29C 66/1312* (2013.01); *B29C 66/43* (2013.01);
(Continued)

(58) Field of Classification Search
CPC ..... B29C 66/1312; B29C 66/43; B29C 66/54; B29C 66/7392; B29C 66/80;
(Continued)

(56) References Cited

U.S. PATENT DOCUMENTS

2019/0291356 A1   9/2019   Mochev et al.
2022/0134676 A1*  5/2022   Mochev .................. B29C 66/43
                                                            156/324

FOREIGN PATENT DOCUMENTS

DE     10019163 A1 *  10/2001
DE     10019300 A1    10/2001
(Continued)

OTHER PUBLICATIONS

Volkswagen AG, DE 100 19 163 A1—machine translation of description (Year: 2023).*
(Continued)

*Primary Examiner* — Cynthia L Schaller
(74) *Attorney, Agent, or Firm* — Armstrong Teasdale LLP

(57) ABSTRACT

Described herein is a process for producing a molded body which encloses a cavity, by welding two partial bodies. Also described herein is a die with which the process of producing the molded body can be carried out. Also described herein is a molded body which can be obtained by the process.

9 Claims, 7 Drawing Sheets

(52) U.S. Cl.
CPC .......... *B29C 66/54* (2013.01); *B29C 66/7392* (2013.01); *B29C 66/80* (2013.01); *B29L 2022/00* (2013.01)

(58) Field of Classification Search
CPC .......... B29C 66/9241; B29C 66/72143; B29C 66/73117; B29C 66/326; B29C 66/1142; B29C 66/00141; B29C 66/71; B29C 66/7212; B29C 66/73115; B29C 66/919; B29C 66/24221; B29C 66/2424; B29C 65/103; B29C 66/73921; B29C 66/91933; B29C 66/73773; B29C 66/929; B29C 66/24243; B29C 66/73771; B29C 66/91411; B29C 66/91943; B29C 66/242; B29C 66/24249; B29C 66/30223; B29L 2022/00; B29K 2105/167; B29K 2101/12; B29K 2077/00; B29K 2059/00; B29K 2081/06; B29K 2067/003; B29K 2067/006; B29K 2309/08; B29K 2307/04
See application file for complete search history.

(56) References Cited

FOREIGN PATENT DOCUMENTS

| JP | S6030327 A | * | 2/1985 |
| JP | S6030327 U | | 3/1985 |
| JP | 2015039816 A | | 3/2015 |
| WO | 2017198483 A1 | | 11/2017 |
| WO | 2019096725 A1 | | 5/2019 |

OTHER PUBLICATIONS

BASF SE, WO2017198483A1 published Nov. 23, 2017—machine translation of description (Year: 2023).*
JPS6030327A Machine Translation of Abstract (Year: 2024).*
JPS6030327A Machine Translation of Description (Year: 2024).*
International Search Report for corresponding PCT/EP2020/052773 mailed Apr. 14, 2020, 2 Pages.

* cited by examiner

METHOD FOR PRODUCING A MOULDED BODY THAT ENCLOSES A CAVITY BY WELDING TWO PARTIAL BODIES, AND DIE FOR WELDING TWO PARTIAL BODIES

CROSS-REFERENCE TO RELATED APPLICATIONS

This application is a U.S. National Phase Application of International Patent Application No. PCT/EP2020/052773, filed Feb. 4, 2020, which claims priority to European Patent Application No. 19157240.3, filed Feb. 14, 2019, the entire contents of which are hereby incorporated by reference herein.

DESCRIPTION

The present invention relates to a process for the production of a molded body which encloses a cavity, by welding of two partial bodies (1a, 1b), and also to a die (5) with which the process of production of the molded body can be carried out. The present invention further relates to the molded body which can be obtained by the process of the invention.

For the production of complex molding bodies, for example of hollow molding bodies, it is necessary to weld two or more partial bodies to one another. Various processes for this purpose have been described in the prior art.

EP 1 415 789 describes a die which is introduced between two plastics parts that are to be connected. By using radiant heat and a hot inert gas stream in a contactless method, said die can heat the areas that are to be welded of the plastics parts that are to be connected.

The process described in EP 1 415 789 has the disadvantage that the gas-discharge apertures are nozzle apertures which provide only spot-heating of the weld region. It is therefore not possible to achieve uniform heating of the weld region. Instead of said uniform heating, local overheating can occur, with local degradation of the polymer comprised in the plastics parts; at the same time, there are weld regions where the plastics part or the polymer comprised therein does not melt sufficiently, with resultant weakening of the weld formed at these locations. If the molded bodies to be welded moreover exhibit warpage, the non-uniformity of heating is additionally increased. The resultant temperature variations along the weld region lead to differences in the extent of melting of the polymer; this causes variations in quality along the weld.

WO 2017/198483 discloses a process for the welding of molded bodies, where the terminal region (2a) of a first molded body (1a) is melted with the aid of a channel (7a) by a means (11a) for the introduction of a hot gas, and where the joining surface (2b) of the second molded body (1b) is likewise melted with the aid of channel (7b) that comprises a means (11b) for the introduction of a hot gas, and where the heated terminal region (2a) of the first molded body (1a) is connected to the heated joining surface (2b) of the second molded body (1b). The process described in WO 2017/198483 permits uniform melting of the joining surface (2a) and of the joining surface (2b), and therefore a uniform weld is generally obtained.

If the process described in WO 2017/198483 is used to weld partial bodies which have an aperture adjacent to which there is a continuous external surface, welds obtained are in some cases not symmetrical. This can in some cases lead to reduced strength of the weld.

The object underlying the present invention therefore consists in provision of a process for the production of molded bodies which enclose a cavity by welding of two partial bodies, which does not exhibit, or exhibits only to a reduced extent, the above-described disadvantages of the processes of the prior art. A further intention is to permit conduct of the process with the greatest possible simplicity and at the lowest possible cost.

Said object is achieved via a process for the production of a molded body which encloses a cavity, by welding of two partial bodies (1a, 1b),
comprising the steps a), b), c), d) and e):
a) Provision of the first partial body (1a), where the first partial body (1a) comprises a continuous welding web (2a),
b) Provision of a die (5) which comprises a continuous channel (7a), where the course of the channel (7a) in essence corresponds to the course of the welding web (2a), where the channel (7a) comprises means (11a) for the introduction of hot gas, and where the die (5) comprises a means (30a) for the active regulation of pressure,
c) Positioning of the welding web (2a) of the first partial body (1a) in the region of the channel (7a) of the die (5), whereupon a first internal space (20a) is formed between the first partial body (1a) and the die (5),
d) Introduction of hot gas through the channel (7a), with resultant melting of the welding web (2a) of the first partial body (1a), and active regulation of the pressure in the first internal space (20a) by the means (30a) and
e) Bringing the molten welding web (2a) of the first partial body into contact with a welding web (2b) of the second partial body (1b), where the course of the welding web (2b) in essence corresponds to the course of the welding web (2a).

Surprisingly, it has been found that with the process of the invention it is possible to achieve greater uniformity of heating of the welding web (2a) of the first partial body (1a), with resultant improved weld qualities. In a preferred embodiment, the above also applies to the welding web (2b) of the second partial body (1b), which according to a preferred embodiment of the present invention can likewise be heated more uniformly. The better weld qualities result from the greater uniformity of melting of the welding web (2a) and/or of the welding web (2b), with a resultant particularly uniform thickness of the weld, and also greater symmetry of the weld.

The process of the invention can moreover sometimes be carried out more rapidly than the processes described in the prior art, and therefore results in shorter cycle times than the processes described in the prior art. For the purposes of the present invention, the expression "cycle time" means the period from the start of the positioning of the first partial body (1a) and of the second partial body (1b) in step c) to the production, in step e), of the molded body which encloses a cavity.

The invention is explained in more detail below.

Step a)

In step a), the first partial body (1a) is provided.

According to the invention, the first partial body (1a) comprises a continuous welding web (2a). In a preferred embodiment, the first partial body (1a) comprises an aperture which is delimited by the welding web (2a). In a preferred embodiment, an external surface (3a) which in essence is continuous is adjacent to the welding web (2a). The external surface (3a) delimits the partial body (1a) externally.

Figure 3A:
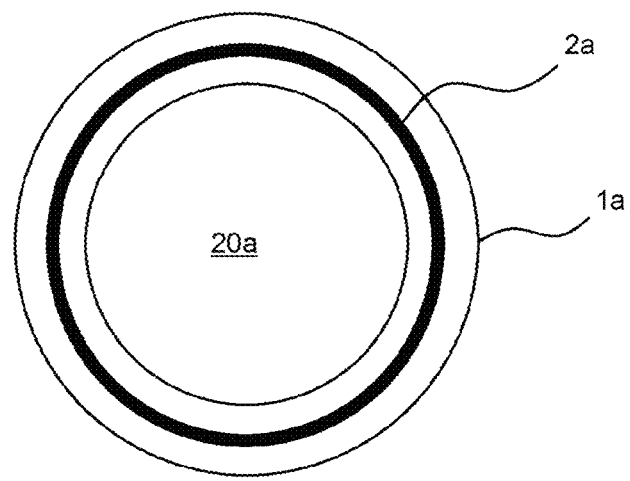
FIG. 3a illustrates a plan view of a hemispherical partial body (1a) with a welding web (2a).

According to the invention, the expression "in essence continuous" means that the external surface (3a) has, based on the total area of the external surface (3a), less than 10%, preferably less than 5% and particularly preferably less than 2.5%, of aperture areas. In a particularly preferred embodiment, the external surface (3a) has no apertures. A first internal space (20a) of the first partial body (1a) is defined by the region which lies between the internal surface (4a) of the first partial body (1a) and the area circumscribed by the welding web (2a). FIG. 3a shows by way of example the plan view of a hemispherical partial body (1a) with a welding web (2a). The welding web (2a) defines the terminal region of the first partial body (1a).

The welding web (2a) can be designed in any of the shapes known to the person skilled in the art. By way of example, the welding web (2a) can be designed in areal shape, in ridge shape, in step shape or in rib shape. In a preferred embodiment, the welding web (2a) is designed in rib shape, where the rib has a rectangular cross section. The width of the welding web (2a) is usually in the range of 0.5 to 16 mm, preferably in the range from 1 to 10 mm and particularly preferably in the range of 2 to 8 mm.

Figure 3B:
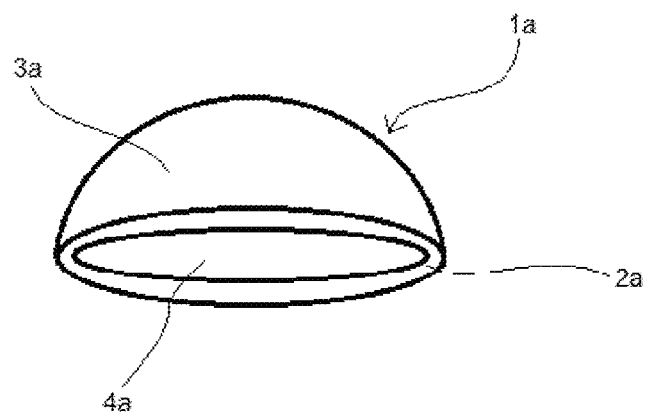
FIG. 3b illustrates a perspective view of a hemispherical partial body (1a), where the terminal region of the partial body (1a) forms the welding web (2a).
Figure 4:
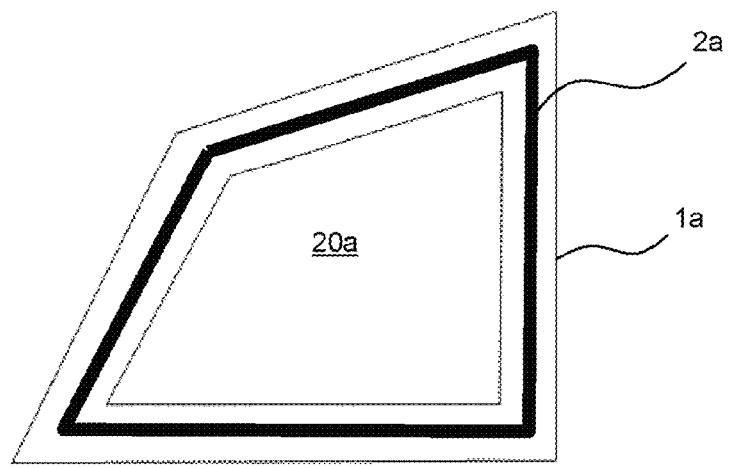
FIG. 4 illgstrates the first internal space (20a).
Figure 5A:
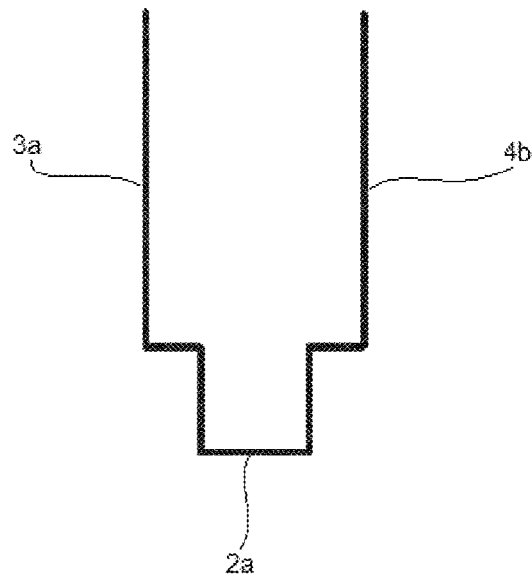
FIGS. 5a to 5d illustrate the terminal regions of first partial bodies (1a).
Figure 5B:
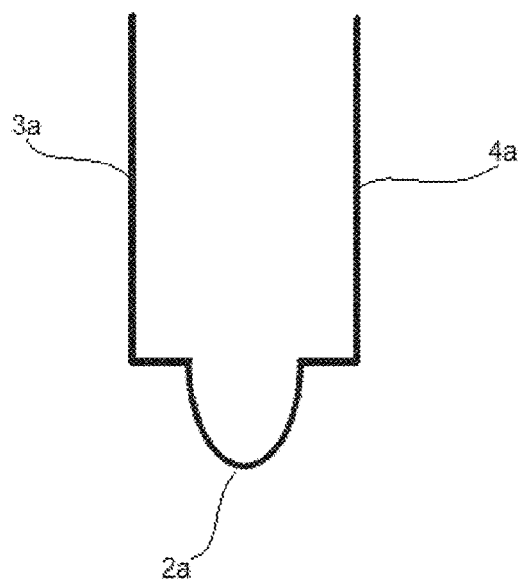
Figure 5C:
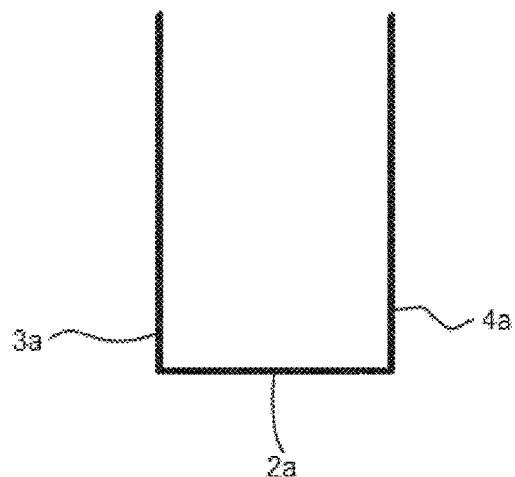
Figure 5D:
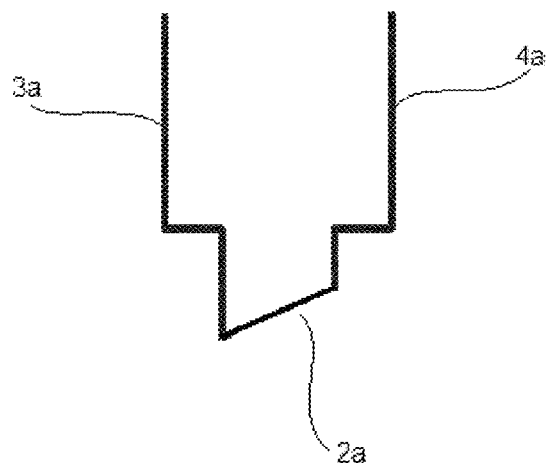

If the width of the terminal region of the first partial body (1a) is in the range of 1 to 6 mm, the terminal region of the first partial body (1a) can itself form the welding web (2a). FIG. 3b) shows by way of example a perspective view of a hemispherical partial body (1a) where the terminal region of the partial body (1a) forms the welding web (2a).

In a preferred embodiment, the welding web (2a) comprises a first thermoplastic polymer.

For the purposes of the present invention, the expression "a first thermoplastic polymer" means either precisely one first thermoplastic polymer or else a mixture of two or more first thermoplastic polymers.

Any of the thermoplastic polymers known to the person skilled in the art is suitable as first thermoplastic polymer. The first thermoplastic polymer is preferably selected from the group consisting of amorphous thermoplastic polymers and semicrystalline thermoplastic polymers.

The first thermoplastic polymer is therefore by way of example selected from the group consisting of polyamides, polyoxymethylenenes, polyphthalamide (PPA), polysulfones (PSU), polyether sulfones (PESU), polyphenyl sulfones (PPSU), polyethylene terephthalates and polybutylene terephthalates.

The present invention therefore also provides a process in which the first thermoplastic polymer comprised in the welding web (2a) is selected from the group consisting of polyamides, polyoxymethylenenes, polyphthalamide (PPA), polysulfones (PSU), polyether sulfones (PESU), polyphenyl sulfones (PPSU), polyethylene terephthalates and polybutylene terephthalates.

The first thermoplastic polymer usually has a glass transition temperature ($T_{G1}$). By way of example, the glass transition temperature ($T_{G1}$) of the first thermoplastic polymer is in the range of 50 to 350° C., preferably in the range of 150 to 270° C. and with particular preference in the range of 170 to 240° C., determined by means of differential scanning calorimetry (DSC).

The present invention therefore also provides a process in which the first thermoplastic polymer has a glass transition temperature ($T_{G1}$) which is in the range of 50 to 350° C.

If the first thermoplastic polymer is a semicrystalline thermoplastic polymer, the first thermoplastic polymer usually additionally then has a melting point ($T_{M1}$). By way of example, the melting point ($T_{M1}$) of the first thermoplastic polymer is then in the range of 80 to 400° C., preferably in the range of 140 to 320° C. and with particular preference in the range of 160 to 300° C., determined by means of differential scanning calorimetry (DSC).

The present invention therefore also provides a process in which, if the first thermoplastic polymer is a semicrystalline thermoplastic polymer, the melting point ($T_{M1}$) of the first thermoplastic polymer is in the range of 80 to 400° C.

The welding web (2a) of the first partial body (1a) can comprise not only the first thermoplastic polymer but additionally further components. Such further components are known to the person skilled in the art and and are by way of example selected from the group consisting of the fillers and additives.

Materials suitable as fillers are any of the fillers that are used for thermoplastic polymers and are known to the person skilled in the art. Such fillers are by way of example selected from the group consisting of glass spheres, glass fibers, carbon fibers, carbon nanotubes and chalk.

Suitable additives are likewise known to the person skilled in the art and by way of example are selected from the group consisting of antinucleating agents, stabilizers, terminal-group-functionalizers and dyes.

It is preferable that the first partial body (1a) comprises the first thermoplastic polymer.

With particular preference, the first partial body (1a) comprises the same components as the welding web (2a). If, therefore, the welding web (2a) comprises not only the first thermoplastic polymer but additionally further components, it is then preferable that the first partial body (1a) likewise comprises not only the first thermoplastic polymer but also the further components.

The first partial body (1a) can have any of the shapes known to the person skilled in the art. The first partial body (1a) preferably has shapes in which compliance is achieved with the abovementioned conditions that are preferred according to the invention. The molded body preferably has the shape of a shell or of a box, where the shape defined by the course of the welding web (2a) and also the shape of the external side (3a) and the internal side (4a) can exhibit complex shapes of the type by way of example required in automobile construction.

In a preferred embodiment, a second partial body (1b) is additionally provided in step a), where the second partial body (1b) comprises a continuous welding web (2b). The description and preferences provided above in relation to the first partial body (1a) apply correspondingly to the second partial body (1b).

The present invention therefore provides a process in which step a) additionally comprises the provision of the second partial body (1b), where the second partial body (1b) comprises a continuous welding web (2b).

The provision of the first partial body (1a) and of the second partial body (2b) can be achieved by any of the methods known to the person skilled in the art, for example by means of injection molding, extrusion or blow molding. The FIGS. 5a to 5d show by way of example the terminal regions of first partial bodies (1a). The terminal regions of the second partial bodies (1b) can have corresponding shapes. It is self-evident that when the first partial body (1a) shown in the FIGS. 5a to 5d is welded to a second partial body (1b), the course of the welding web (2b) of the second partial body (1b) is preferably a mirror image of the course of the welding web (2a) of the first partial body (1a).

For the purposes of the present invention, the expressions "welding web (2a) of the first partial body (1a)" and "welding web (2a)" are used synonymously and therefore have the same meaning. The same also applies to the expressions "welding web (2b) of the second partial body (1b)" and "welding web (2b)". For the purposes of the present, these expressions are likewise used synonymously and therefore likewise have the same meaning.

It is moreover self-evident that the welding web (2a) and the welding web (2b) are different welding webs. In a preferred embodiment, the welding web (2a) and the welding web (2b) have an in essence congruent course, and therefore the two welding webs (2a;2b) can be welded in process step e) to form a weld.

The above also applies correspondingly to the expressions "external surface (3a) of the first partial body (1a)" and "external surface (3a)". For the purposes of the present, these expressions are used synonymously and therefore likewise have the same meaning. For the purposes of the present invention, the expressions "external surface (3b) of the second partial body (1b)" and "external surface (3b)" are likewise used synonymously and therefore have the same meaning.

For the purposes of the present invention, furthermore, the expressions "internal surface (4a) of the first partial body (1a)" and "internal surface (4a)" are used synonymously. These expressions therefore likewise have the same meaning. For the purposes of the present invention, furthermore, the expressions "internal surface (4b) of the first partial body (1b)" and "internal surface (4b)" are used synonymously. These expression therefore likewise have the same meaning.
Step b)

In step b), a die (5) is provided.

In a preferred embodiment, the die (5) provided in step b) comprises a first side (6a) and a second side (6b), where the channel (7a) is arranged on the first side (6a) and where a continuous channel (7b) is arranged on the second side (6b), where the channel (7b) comprises a means (11b) for the introduction of hot gas and where a means (30b) for the active regulation of pressure is arranged on the second side (6b).

The present invention therefore provides a process in which the die (5) provided in step b) comprises a first side (6a) and a second side (6b), where the channel (7a) is arranged on the first side (6a) and where a continuous channel (7b) is arranged on the second side (6b), where the channel (7b) comprises a means (11b) for the introduction of hot gas and where a means (30b) for the active regulation of pressure is arranged on the second side (6b).

Figure 1:
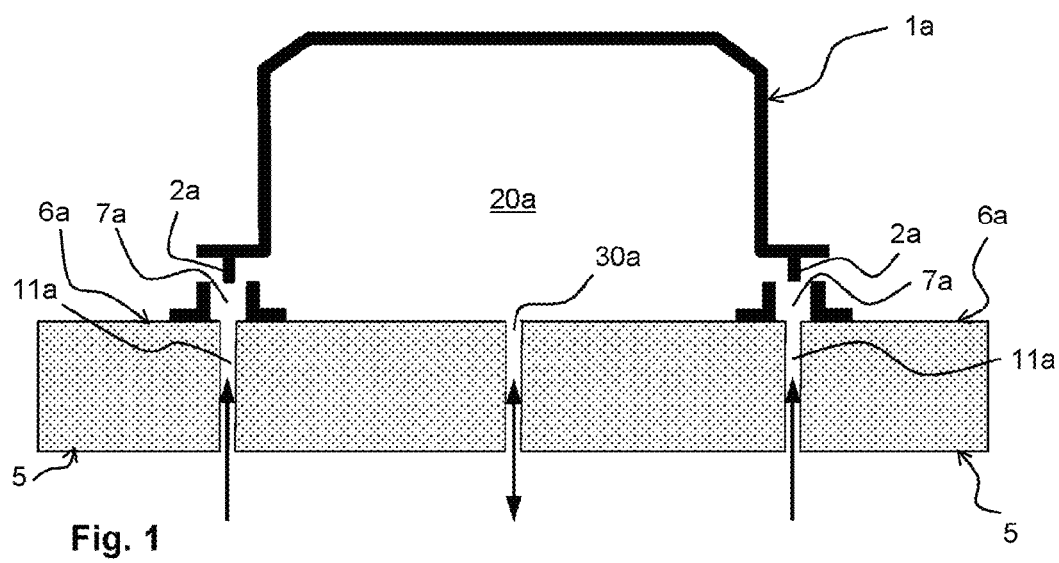
FIGS. 1 and 2 illustrate a cross-sectional view of the die (5) on which the first welding body (1a) or the first partial body (1a) and the second partial body (1b) are positioned.
Figure 2:
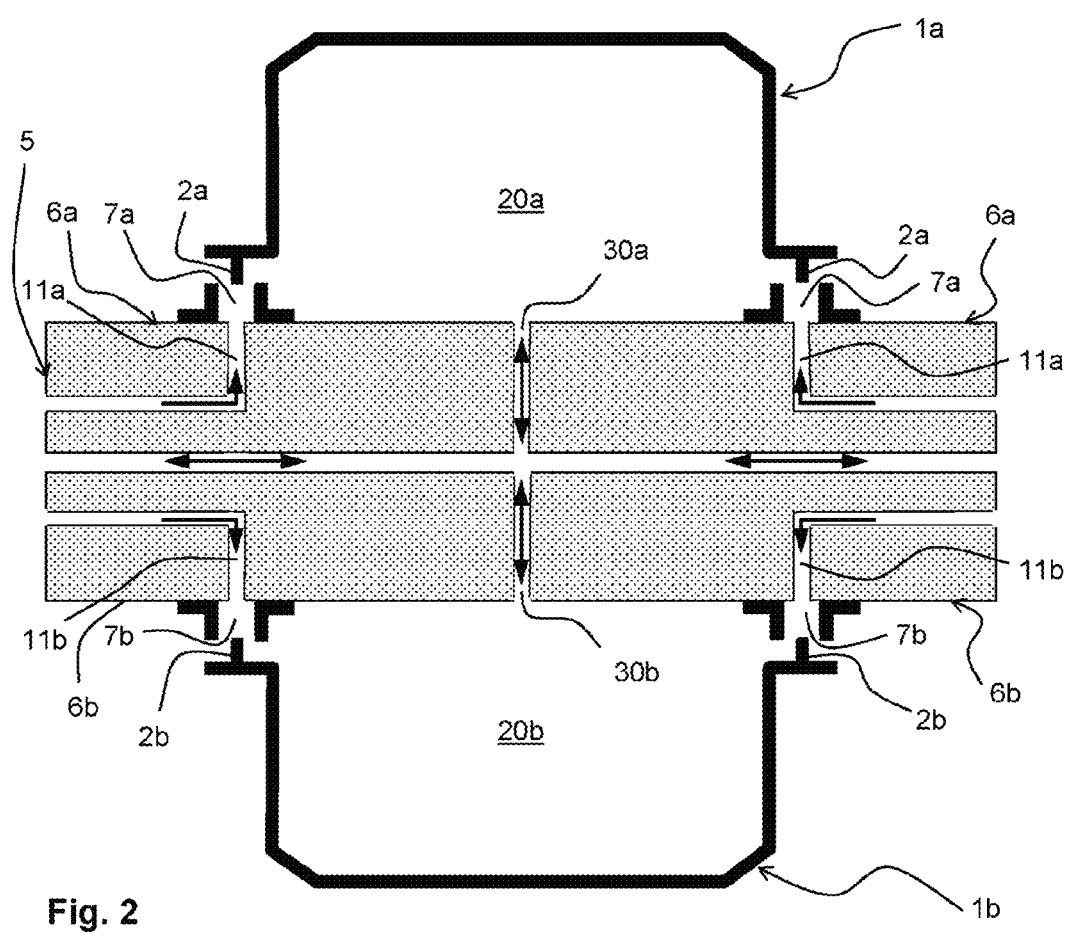

The FIGS. 1 and 2 show by way of example the cross section of the die (5) on which the first welding body (1a) or the first partial body (1a) and the second partial body (1b) are positioned.

Means suitable as means (11a) for the introduction of hot gas into the channel (7a) are any of the means (11a) that are known to the person skilled in the art and are suitable for the introduction of gases, for example nozzles, bores and/or slots. The same applies to the means (11b).

The die (5) moreover comprises a means (30a) for the active regulation of pressure. Means (30a) suitable as means (30a) are any of those that are known to the person skilled in the art and can be used for active regulation of pressure. Suitable means (30a) for the active regulation of pressure are by way of example pumps by which gas can be conveyed. Suitable pumps are by way of example vacuum pumps or ejectors or compressors. Vacuum pumps or ejectors can be used to reduce pressure; compressors can be used to increase pressure. The above descriptions relating to the means (30a) apply correspondingly to the means (30b).

In a preferred embodiment, the means (30a) is positioned in a region that is enclosed by the course of the channel (7a). It is preferable that the means (30a) on the first side (6a) of the die (5) is positioned in a region that is enclosed by the course of the channel (7a).

The present invention therefore provides a process in which the means (30a) is positioned in a region that is enclosed by the course of the channel (7a).

In a preferred embodiment, the means (30b) is positioned in a region that is enclosed by the course of the channel (7b). In another preferred embodiment, the means (30b) on the second side (6b) of the die (5) is positioned in a region that is enclosed by the channel (7b).

In a preferred embodiment, the course of the channel (7a) in essence corresponds to the course of the welding web (2a). The above means that in a projection of the course of the welding web (2a) onto the die (5), preferably onto the first side (6a) of the die (5), at least 80% of the area of the projection of the welding web (2a) is within the channel (7a). At least 90% of the area of the projection of the welding web (2a), with particular preference at least 95%, lies within the course of the channel (7a), and most preferably the projection of the welding web (2a) lies entirely within the channel (7a).

In another preferred embodiment, the area of the channel (7a) is therefore preferably greater than the area of the course of the welding web (2a) (based on the end face of the welding web (2a)). In this embodiment, it is possible to introduce the welding web (2a) into the channel (7a).

The above descriptions and preferences apply correspondingly to the course of the welding web (2b), and also to the course of the channel (7b).

In a particularly preferred embodiment, the means (30a) comprises an aperture in the die (5); by way of said aperture it is possible to connect a vacuum pump and/or a compressor to the die (5). The same applies to the means (30b).

For the purposes of the present invention, the expressions "first side (6a) of the die (5)" and "first side (6a)" are used synonymously and therefore have the same meaning. The same also applies to the expressions "second side (6b) of the die (5)" and "second side (6b)". For the purposes of the present invention, these expressions are likewise used synonymously and therefore likewise have the same meaning.

It is moreover self-evident that the first side (6a) and the second side (6b) are different sides of the die (5). It is preferable that the first side (6a) and the second side (6b) lie at opposite sides of the die (5).

It is self-evident that the channel (7a) and the channel (7b) are different channels. The same applies to the means for the introduction of hot gas (11a) and the means for the introduction of hot gas (11b). These are also different means. For the purposes of the present invention, the expressions "means for the introduction of hot gas (11e)" and "means 11(a)" are moreover used synonymously and therefore have the same meaning. The same applies to the expressions "means for the introduction of hot gas (11b)" and "means (11b)". These expressions are likewise used synonymously and for the purposes of the present invention have the same meaning.

It is moreover self-evident that the channel-entry plane (14a) and the channel-entry plane (14b) are different channel-entry planes. The same applies to the means (30a) for the active regulation of pressure and the means (30b) for the active regulation of pressure. These are different means for the active regulation of pressure.

For the purposes of the present invention, furthermore, the expressions "means for the active regulation of pressure (30a)" and "means (30a)" are used synonymously and therefore have the same meaning. The same applies to the expressions "means for active regulation of pressure (30b)" and "means (30b)". For the purposes of the present invention, these expressions are likewise used synonymously and therefore have the same meaning.

The channel (7a) is preferably arranged on the first side (6a) of the die (5). The channel (7a), which is arranged on the first side (6a) of the die (5), moreover preferably comprises a means (11a) for the introduction of hot gases. The channel (7b) is preferably arranged on the second side (6b) of the die (5). The channel (7b), which is arranged on the second side (6b) of the die (5), moreover preferably has a means (11b) for the introduction of hot gas.

Hot gases are introduced by the means (11a) and (11b). The means (11a) and (11b) are suitable for heating the welding webs (2a;2b) in order to weld these subsequently in step e), preferably with formation of a weld. The means (11a;11b) for the introduction of hot gas differ from the means (30a;30b) for the active regulation of pressure. The means (30a; 30b) for the active regulation of pressure are not suitable for melting the welding webs (2a;2b).

Step c)

In step c), the welding web (2a) of the first partial body (1a) is positioned in the region of the channel (7a) of the die (5).

As depicted by way of example in the FIGS. 1 and 2, a first internal space (20a) is thus formed between the first partial body (1a) and the die (5). It is preferable that the first internal space (20a) is formed between the first partial body (1a) and the first side (6a) of the die (5). In step c) in a preferred embodiment, the welding web (2b) of the second partial body (1b) is additionally positioned in the region of the channel (7b) of the die (5), whereupon a second internal space (20b) is formed between the second partial body (1b) and the die (5). It is preferable that the second internal space (20b) is formed between the second side (6b) of the die (5) and the second partial body (1b).

The present invention therefore provides a process in which step c) additionally comprises the positioning of the welding web (2b) of the second partial body (1b) in the region of the channel (7b) of the die (5), whereupon a second internal space (20b) is formed between the second partial body (1b) and the die (5), and step d) additionally comprises the introduction of hot gas through the channel (7b), with resultant melting of the welding web (2b) of the second partial body (1b), and the active regulation of the pressure in the second internal space (20b) by the means (30b).

In a preferred embodiment, in step c), the welding web (2a) is positioned in a region of the channel (7a), where the distance (Xa) between the die-(5) facing end face of the welding web (2a) and the channel-entry plane (14a) is in the range of >0 to 3 mm outside of the channel (7a) or in the range of 0 to 10 mm inside of the channel (7a). It is preferable that the distance (Xa) is in the range of 0.5 to 8 mm inside the channel. It is self-evident that the distance (Xa) inside the channel (7a) is always smaller than the channel depth of the channel (7a). If the distance (Xa) is in the range of >0 to 3 mm outside of the channel (7a), the location of the welding web (2a) is outside of the channel region.

In another preferred embodiment, in step c), the welding web (2b) is positioned in a region of the channel (7b), where the distance (Xb) between the die-(5) facing end face of the welding web (2b) and the channel-entry plane (14b) is in the range of >0 to 3 mm outside of the channel (7b) or in the range of 0 to 10 mm inside of the channel (7b). It is preferable that the distance (Xb) is in the range of 0.5 to 8 mm inside the channel (7b).

The descriptions and preferences provided above for the positioning of the welding web (2b) moreover apply correspondingly to the positioning of the welding web (2b) in step c).

The present invention therefore provides a process in which, in step c), the welding web (2a) is positioned in a region of the channel (7a), where the distance (Xa) between the die-(5) facing end face of the welding web (2a) and the channel-entry plane (14a) is in the range of >0 to 3 mm outside of the channel (7a) or in the range of 0 to 10 mm inside of the channel (7a).

The present invention therefore provides a process in which, in step c), the welding web (2b) is positioned in a region of the channel (7b), where the distance (Xb) between the die-(5) facing end face of the welding web (2b) and the channel-entry plane (14b) is in the range of >0 to 3 mm outside of the channel (7b) or in the range of 0 to 10 mm inside of the channel (7b).

Figure 6A:
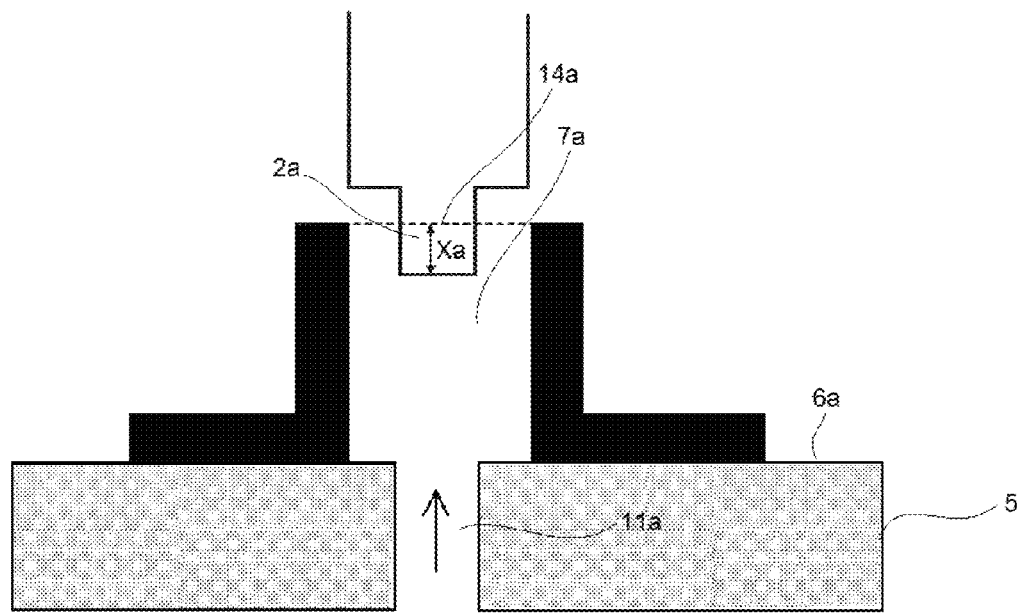
FIGS. 6a and 6b illustrate the preferred positioning of the welding webs (2a, 2b) in the region of the channels (7a, 7b).
Figure 6B:
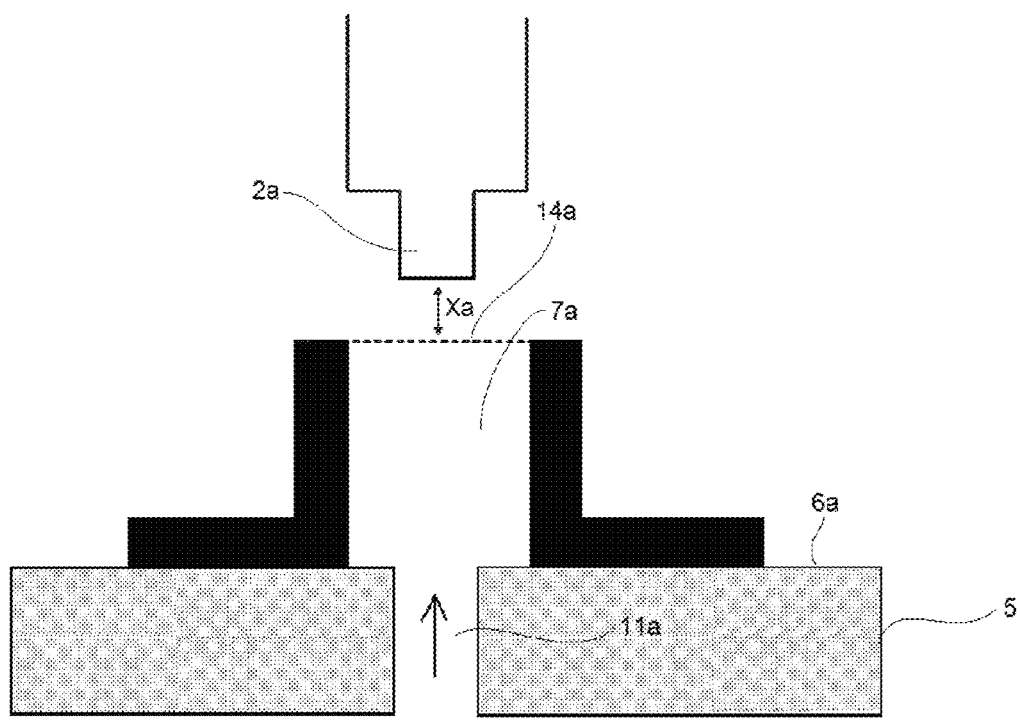

The preferred positioning of the welding webs (2a, 2b) in the region of the channels (7a, 7b) is depicted by way of example in the FIGS. 6a and 6b. In FIG. 6a, the end face of the welding web (2a) is positioned inside the channel (7a). The distance (Xa) of the end face of the welding web (2a) from the channel-entry plane (14a) is likewise depicted. In FIG. 6b, the location of the end face of the welding web (2a) is outside of the channel (7a) and therefore above the channel-entry plane (14a).

Step d)

In step d), a hot gas is introduced by the means (11a) into the channel (7a). During this procedure, the welding web (2a) of the first partial body (1a) is heated, and the first thermoplastic polymer comprised in the welding web (2a) melts.

For the purposes of the present invention, the expression "a hot gas" means either precisely one hot gas or else a mixture of two or more hot gases.

It is self-evident that in step d) the region surrounding the welding web (2a) can also be heated. This is in particular the case when the welding web (2a) is designed in linear form, ridge form or rib form.

In this embodiment, it is preferable that the first partial body (1a) comprises the first thermoplastic polymer and that then the first thermoplastic polymer comprised in the region surrounding the welding web (2a) also melts.

The hot gas can be introduced by any of the methods known by the person skilled in the art into the means (11a) for the introduction of gas into the channel (7a).

Gases suitable as hot gas are any of the gases known to the person skilled in the art. Such gases are by way of example selected from the group consisting of $CO_2$, $N_2$ and air.

The present invention therefore also provides a process in which the hot gas that is introduced in step d) is selected from the group consisting of $CO_2$, $N_2$ and air.

For the purposes of the present invention, the term "air" means the gas mixture of the Earth's atmosphere. This is known to the person skilled in the art.

The hot gas can be heated by any of the methods known to the person skilled in the art. By way of example, it can be heated by a heat exchanger. It is moreover by way of example possible, if the hot gas is $CO_2$, that the hot gas is produced in situ by combustion of hydrocarbons, and for this reason is hot.

The temperature of the hot gas is by way of example in the range of 100 to 600° C., preferably in the range of 250 to 500° C. and with particular preference in the range of 300 to 500° C.

The present invention therefore also provides a process in which the temperature of the hot gas that is introduced in step d) is in the range of 100° C. to 600° C.

It is self-evident that the temperature of the hot gas that is introduced in step d) is based on the hot gas on exit from the means (11a) for the introduction of a gas into the channel (7a), i.e. on the temperature of the hot gas in the channel (7a).

The welding web (2a) of the first partial body (1a) can be heated in step d) to any desired temperature ($T_{1a}$). The temperature ($T_{1a}$) is usually below the decomposition temperature of the first thermoplastic polymer comprised in the welding web (2a). It is preferable that the welding web (2a) of the first partial body (1a) is heated in step d) to a temperature ($T_{1a}$) that is above the glass transition temperature ($T_{G1}$) of the first thermoplastic polymer comprised in the welding web (2a), if the first thermoplastic polymer is an amorphous thermoplastic polymer, and that is above the melting point ($T_{M1}$) of the first thermoplastic polymer comprised in the welding web (2a), if the first thermoplastic polymer is a semicrystalline thermoplastic polymer.

The present invention therefore also provides a process in which in step d) the temperature of the welding web (2a) of the first partial body (1a) increases to a temperature ($T_{1a}$) that is above the glass transition temperature ($T_{G1}$) of the first thermoplastic polymer comprised in the welding web (2a), if the first thermoplastic polymer is an amorphous thermoplastic polymer, and that is above the melting point ($T_{M1}$) of the first thermoplastic polymer comprised in the welding web (2a), if the first thermoplastic polymer is a semicrystalline thermoplastic polymer.

By way of example, the temperature of the welding web (2a) of the first partial body (1a) increases to a temperature ($T_{1a}$) that is in the range of 0 to 300° C., preferably in the range of 30 to 250° C. and with particular preference in the range of 60 to 200° C., above the glass transition temperature ($T_{G1}$) of the first thermoplastic polymer comprised in the welding web (2a), if the first thermoplastic polymer is an amorphous thermoplastic polymer, and that is in the range of 0 to 300° C., preferably in the range of 30 to 250° C. and with particular preference in the range of 60 to 200° C., above the melting point ($T_{M1}$) of the first thermoplastic polymer comprised in the welding web (2a), if the first thermoplastic polymer is a semicrystalline thermoplastic polymer.

The present invention therefore also provides a process in which, in step d) the temperature of the welding web (2a) of the first partial body (1a) increases to a temperature ($T_{1a}$) that is in the range of 0 to 300° C. above the glass transition temperature ($T_{G1}$) of the first thermoplastic polymer comprised in the welding web (2a), if the first thermoplastic polymer is an amorphous thermoplastic polymer, and that is in the range of 0 to 300° C. above the melting point ($T_{M1}$) of the first thermoplastic polymer comprised in the welding web (2a), if the first thermoplastic polymer is a semicrystalline thermoplastic polymer.

By way of example, the temperature of the welding web (2a) of the first partial body (1a) increases to a temperature ($T_{1a}$) that is in the range of 100 to 500° C.

The present invention therefore also provides a process in which, in step d), the temperature of the welding web (2a) of the first partial body (1a) increases to a temperature ($T_{1a}$) in the range of 100 to 500° C.

The first thermoplastic polymer melts or softens in step d).

For the purposes of the present invention, the expression "melting or softening" in connection with the first thermoplastic polymer, and also in connection with the second thermoplastic polymer, means that the first thermoplastic polymer or the second thermoplastic polymer is plastically deformable, preferably flowable.

The pressure in the first internal space (20a) is actively regulated in step d) by the means (30a). The active regulation of the pressure can be carried out during the entire duration of the step d). In other words, this means that the active regulation of the pressure is carried out at the same time as the introduction of hot gas through the channel (7a). In this embodiment, the active regulation of pressure is carried out for as long as hot gas is introduced through the channel (7a). This embodiment is preferred.

It is also possible, furthermore, that the active regulation of the pressure is not carried out during the entire period of the introduction of hot gas through the channel (7a). It is therefore possible by way of example to begin initially with the introduction of hot gas through the channel (7a) and to begin the active regulation of pressure with a time delay, i.e. at a juncture that is subsequent to the start of the introduction of hot gas.

In a preferred embodiment, gas is discharged from the first internal space (20a) and/or the second internal space (20b) by the means (30a) and/or the means (30b). It is preferable that the gas is discharged actively by pumped discharge or suction discharge. This preferably takes place during step d).

In another preferred embodiment, gas is introduced by the means (30a) and/or the means (30b) into the first internal space (20a) and/or the second internal space (20b). It is preferable that the introduction takes place actively by injection or pumping into said space. This preferably occurs during process step d).

During process step d), hot gas is introduced through the channel (7a). In the absence of the active pressure regulation of the invention, this results in an internal pressure (pI) in the first internal space (20a) that is higher than the external pressure (pA). Because the internal pressure (pI) is higher than the external pressure (pA), in the absence of active pressure regulation during process step d) the quantity of hot gas flowing past that side of the welding web (2a) that faces away from the first internal space (20a) is greater than the quantity flowing past that side of the welding web (2a) that faces toward the first internal space (20a). That side of the welding web (2a) that faces away from the first internal space (20a) is thus more strongly heated than that side of the welding web (2a) that faces toward the first internal space (20a). The above also applies correspondingly to the heating of the second welding web (2b).

In the absence of the pressure regulation of the invention, the different degree of melting results in welds that are not symmetrical when the welding webs (2a), (2b) are brought into contact in process step e). If the internal pressure (pI) in the first internal space (20a) is greater than the external pressure (pA) in process step d), welds that are not symmetrical are obtained. The higher internal pressure (pI) in process step d) gives a weld that has outward curvature in relation to the first internal space (20a).

Figure 7:
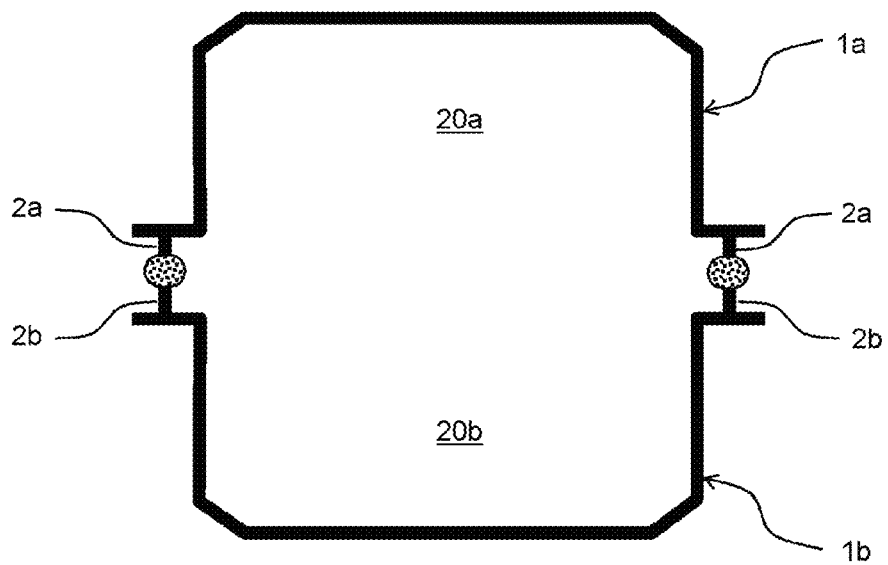
FIGS. 7 and 8 illustrate symmetrical welds of the type obtained through the welding process.
Figure 8:
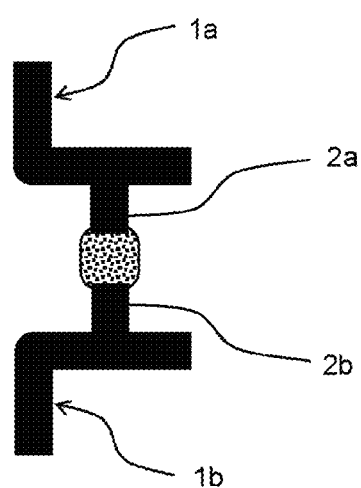

By virtue of the active pressure regulation by the means (30a) it is, according to the invention, possible and preferable to carry out process step d) in a manner that, in the first internal space (30a), in essence equalizes internal pressure (pI) and external pressure (pA). It is preferable that the pressure difference between internal pressure (pI) and external pressure (pA) is at most 50%, preferably at most 30%, more preferably at most 10%, with particular preference at most 5%. Symmetrical welds of the type depicted by way of example in the FIGS. 7 and 8 are thus obtained.

In one embodiment, the extent to which the internal pressure (pI) is above the external pressure (pA) is therefore at most 50%, preferably at most 30%, more preferably at most 10%, with particular preference at most 5%.

In another preferred embodiment, the maximal extent to which the internal pressure (pI) is below the external pressure (pA) is at most 50%, preferably at most 30%, more preferably at most 10%, with particular preference at most 5%.

By virtue of the active pressure regulation, it is therefore possible according to the invention to achieve active influence on the symmetry of the weld.

In a preferred embodiment, the active regulation of pressure is carried out in a manner that gives a symmetrical weld.

The present invention therefore provides a process in which gas is discharged from the first internal space (20a) and/or the second internal space (20b) by the means (30a) and/or the means (30b).

In another embodiment it is possible to use an active increase of the internal pressure (pI) in relation to the external pressure (pA) to control the symmetry of the weld in a manner such that the weld has a bead on the side facing away from the first internal space (20a). For this purpose, the internal pressure (pI) is preferably regulated in process step d) to be above the external pressure by at least 10%, preferably at least 30% and with particular preference at least 50%.

The present invention therefore provides a process in which gas is introduced into the first internal space (20a) and/or the second internal space (20b) by the means (30a) and/or the means (30b).

In another embodiment, the symmetry of the weld is controlled in a manner such that it has a bead on the side facing toward the first internal space (20a). For this purpose, the internal pressure (pI) is preferably regulated in process step d) to be below the external pressure by at least 10%, preferably at least 30% and with particular preference at least 50%.

The descriptions and preferences provided above in respect of the melting of the welding web (2a) and of the active regulation of the pressure in the first internal space (20a) by the means (30a) apply correspondingly to the embodiment, preferred according to the invention, in which the welding web (2b) of the second partial body (1b) is additionally melted in step d), where the pressure in the second internal space (20b) is actively regulated by the means (30b).

Step e)

In step e), the molten welding web (2a) of the first partial body (1a) is brought into contact with the welding web (2b) of the second partial body (1b), where the course of the welding web (2b) in essence corresponds to the course of the welding web (2a). In a preferred embodiment, the course of the welding web (2b) is a mirror image of the course of the welding web (2a).

The expression "bringing into contact" here means physical contact in the heated welding web (2a) of the first partial body (1a) and the heated welding web (2b) of the second partial body (1b).

The heated welding web (2a) of the first partial body (1a) can be brought into contact with the heated welded web (2b) of the second partial body (1b) under pressure, so that the heated welding web (2a) of the first partial body (1a) and the heated welding web (2b) of the second partial body (1b) are pressed against one another. Processes for this purpose are known to the person skilled in the art.

By way of example, the pressure when the heated welding web (2a) of the first partial body (1a) is brought into contact with the welding web (2b) of the second partial body (1b) is in the range of 0.1 to 10 MPa, preferably in the range of 0.5 to 6 MPa.

Bringing of the heated welding web (2a) into contact with the heated welding web (2b) causes bonding of the thermoplastic polymers comprised in the welding webs (2a, 2b). After the heated welding webs (2a, 2b) have been brought into contact, they are cooled, with resultant production of the welded bond. The expressions "heated welding web (2a, 2b)" and "molten welding web (2a, 2b)" and "softened welding web (2a, 2b)" are used synonymously here.

The cooling of the heated welding web (2a) of the first partial body (1a) and of the heated welding web (2b) of the second partial body (1b) in step e) can be achieved by any of the methods known to the person skilled in the art. By way of example, the cooling can be achieved in air.

A weld is formed in step e) between the first partial body (1a) and the second partial body (1b). The location of the weld is in the region in which the welding web (2a) of the first partial body (1a) and the welding web (2b) of the second partial body (1b) originally existed.

A weld is known per se to the person skilled in the art.

The thickness of the weld between the first partial body (1a) and the second partial body (1b) is by way of example in the range of 20 to 1000 μm, preferably in the region of 30 to 400 μm and most preferably in the region of 30 to 300 μm, determined by means of micrographs.

The present invention therefore also provides a process in which the thickness of the weld formed in step e) between the first partial body (1a) and the second partial body (1b) is in the range of 20 to 1000 μm.

The molded body that encloses a cavity is therefore obtained in step e). This molded body features a particularly homogeneous weld and good mechanical properties. The cavity is formed by the first internal space (20a) and the second internal space (20b).

The present invention therefore provides a molded body that encloses a cavity, obtainable by the process of the invention, in which the difference between internal pressure (pI) in the first and second internal space (20a; 20b) and external pressure (pA) is at most 5%.

Die (5)

The present invention also provides the die (5) that is provided in process step b). The descriptions and preferences provided above in respect of the process likewise apply correspondingly to the die (5).

According to the invention, preference is given to a die (5) for the welding of two partial bodies (1a, 1b), which comprises a continuous channel (7a), where the channel (7a) comprises means (11a) for the introduction of hot gas, and where a welding web (2a) of the first first partial body (1a) can be positioned in the region of the channel (7a), where the course of the welding web (2a) in essence corresponds to the course of the channel (7a), where a first internal space (20a) can be formed between the first partial body (1a) and the die (5) and where the die (5) comprises a means (30a) for the active regulation of pressure.

The present invention therefore provides a die (5) for the welding of two partial bodies (1a, 1b), which comprises a continuous channel (7a), where the channel (7a) comprises means (11a) for the introduction of hot gas, and where a welding web (2a) of the first first partial body (1a) can be positioned in the region of the channel (7a), where the course of the welding web (2a) in essence corresponds to the course of the channel (7a), where a first internal space (20a) can be formed between the first partial body (1a) and the die (5) and where the die (5) comprises a means (30a) for the active regulation of pressure.

In a particularly preferred embodiment, the means (30a) for the active regulation of the pressure is positioned in a region that is enclosed by the course of the channel (7a).

The present invention therefore provides a die (5) in which the means (30a) is positioned in a region that is enclosed by the course of the channel (7a).

Particular preference is given to a die (5) which comprises a first side (6a) and a second side (6b), where the channel (7a) is arranged on the first side (6a), and where the die (5) comprises a continuous channel (7b), where the channel (7b) comprises means (11b) for the introduction of hot gas, and where a welding web (2b) of the second partial body (1b) can be positioned in the region of the channel (7b), where the course of the welding web (2b) in essence corresponds to the course of the channel (7b), where a second internal space (20b) can be formed between the second partial body (1b) and the die (5), and where the die (5) comprises a means (30b) for the active regulation of pressure, and where the channel (7b) is arranged on the second side (6b) of the die (5).

The present invention therefore provides a die (5) which comprises a first side (6a) and a second side (6b), where the channel (7a) is arranged on the first side (6a), and where the die (5) comprises a continuous channel (7b), where the channel (7b) comprises means (11b) for the introduction of hot gas, and where a welding web (2b) of the second partial body (1b) can be positioned in the region of the channel (7b), where the course of the welding web (2b) in essence corresponds to the course of the channel (7b), where a second internal space (20b) can be formed between the second partial body (1b) and the die (5), and where the die (5) comprises a means (30b) for the active regulation of pressure, and where the channel (7b) is arranged on the second side (6b) of the die (5).

Particular preference is given to a die (5) in which the means (30b) is positioned in a region that is enclosed by the course of the channel (7b).

The present invention therefore provides a die (5) in which the means (30b) is positioned in a region that is enclosed by the course of the channel (7b).

The present invention therefore provides a process in which the means (30a) is positioned in the first partial body (1a) and/or the means (30b) is positioned in the second partial body (1b).

LIST OF REFERENCE SYMBOLS

1a First partial body
1b Second partial body
2a Welding web of the first partial body 1a
2b Welding web of the second partial body 1b
3a External surface of the first partial body 1a
3b External surface of the second partial body 1b
4a Internal surface of the first partial body 1a
4b Internal surface of the second partial body 1b
5 Die
6a First side of the die 5
6b Second side of the die 5
7a Channel
7b Channel
11a Means for the introduction of hot gas
11b Means for the introduction of hot gas
14a Channel-entry plane
14b Channel-entry plane
20a First internal space
20b Second internal space
30a Means for the active regulation of pressure
30b Means for the active regulation of pressure
Xa Distance

The invention claimed is:

1. A process for producing a molded body which encloses a cavity, by welding of two partial bodies (1a, 1b), comprising the steps a), b), c), d) and e):
   a) providing a first partial body (1a), wherein the first partial body (1a) comprises a continuous first welding web (2a) with a course,
   b) providing a die (5) which comprises a continuous first channel (7a) with a course, wherein the course of the first channel (7a) corresponds to the course of the first welding web (2a), wherein the first channel (7a) comprises first means (11a) for introducing hot gas, and wherein the die (5) comprises a first means (30a) for an active regulation of pressure,
   c) positioning the first welding web (2a) of the first partial body (1a) in a region of the first channel (7a) of the die (5), whereupon a first internal space (20a) is formed between the first partial body (1a) of the two partial bodies and the die (5),
   d) introducing hot gas through the first channel (7a), with resultant melting of the first welding web (2a) of the first partial body (1a), and active regulation of a pressure in the first internal space (20a) by the first means (30a) and
   e) bringing the molten first welding web (2a) of the first partial body (1a) into contact with a second welding web (2b) with a course of a second partial body (1b), wherein the course of the second welding web (2b) corresponds to the course of the first welding web (2a), wherein gas is discharged from the first internal space (20a) and/or a second internal space (20b) by the first means (30a) and/or a second means (30b) for an active regulation of pressure.

2. The process according to claim 1, wherein the first means (30a) is positioned in a region that is enclosed by the course of the first channel (7a).

3. The process according to claim 1, wherein step a) additionally comprises providing the second partial body (1b), wherein the second partial body (1b) comprises the second welding web (2b).

4. The process according to claim 1, wherein the die (5) provided in step b) comprises a first side (6a) and a second side (6b), wherein the first channel (7a) is arranged on the first side (6*a*) and wherein a continuous second channel (7*b*) is arranged on the second side (6*b*), wherein the second channel (7*b*) comprises a means (11*b*) for introducing hot gas and wherein the second means (30*b*) for an active regulation of pressure is arranged on the second side (6*b*).

5. The process according to claim 1, wherein step c) additionally comprises positioning the second welding web (2*b*) of the second partial body (1*b*) in a region of the second channel (7*b*) of the die (5), whereupon a second internal space (20*b*) is formed between the second partial body (1*b*) and the die (5), and step d) additionally comprises introducing hot gas through the second channel (7*b*), with resulting melting of the second welding web (2*b*) of the second partial body (1*b*), and an active regulation of a pressure in the second internal space (20*b*) by the second means (30*b*).

6. The process according to claim 1, wherein gas is introduced into the first internal space (20*a*) and/or the second internal space (20*b*) by the first means (30*a*) and/or the second means (30*b*).

7. The process according to claim 1, wherein, in step c), the first welding web (2*a*) is positioned in a region of the first channel (7*a*), wherein a first distance (Xa) between a die-(5) facing end face of the first welding web (2*a*) and a first channel-entry plane (14*a*) is in a range of >0 to 3 mm outside of the first channel (7*a*) or in a range of 0 to 10 mm inside of the first channel (7*a*).

8. The process according to claim 1, wherein, in step c), the second welding web (2*b*) is positioned in a region of a second channel (7*b*), wherein a second distance (Xb) between a die-(5) facing end face of the second welding web (2*b*) and a second channel-entry plane (14*b*) is in a range of >0 to 3 mm outside of the second channel (7*b*) or in a range of 0 to 10 mm inside of the second channel (7*b*).

9. The process according to claim 1, wherein the first means (30*a*) comprised in the die (5) is positioned in the first partial body (1*a*) and/or the second means (30*b*) comprised in the die (5) is positioned in the second partial body (1*b*).

* * * * *